M. H. Mansfield's Clover Seed Thresher, Huller & Separator

[111.] No. 4,566. Reissued Sep. 19, 1871.

Witnesses
T. T. Campbell,
J. N. Campbell.

Inventor
Martin H. Mansfield
by his attys
Mason Fenwick & Lawrence

AM. PHOTO-LITHOGRAPHIC CO. N.Y. (OSBORNE'S PROCESS.)

UNITED STATES PATENT OFFICE.

MARTIN H. MANSFIELD, OF ASHLAND, OHIO.

IMPROVEMENT IN MACHINES FOR THRASHING, HULLING, AND CLEANING CLOVER-SEED.

Specification forming part of Letters Patent No. 56,583, dated July 24, 1866; reissue No. 4,566, dated September 19, 1871.

*To all whom it may concern:*

Be it known that I, MARTIN H. MANSFIELD, of Ashland, in the county of Ashland and State of Ohio, have invented certain novel Improvements on Machinery for Hulling, Thrashing, and Cleaning Clover-Seed; and I do hereby declare that the following is a full, clear, and exact description thereof, reference being had to the accompanying drawing making a part of this specification, in which—

Figure 1:
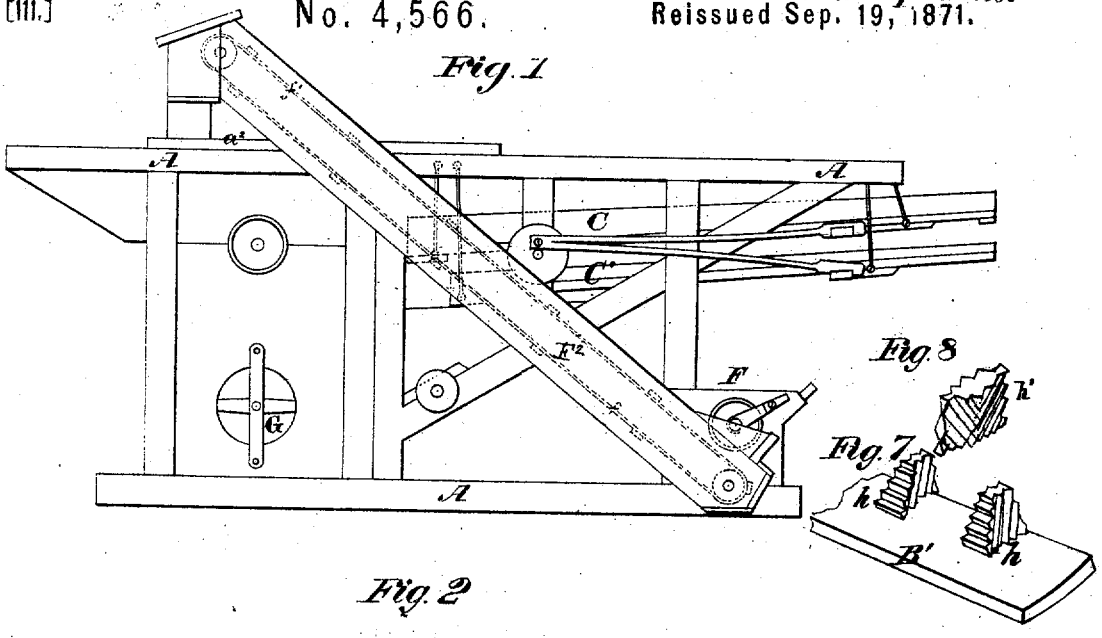
Figure 2:
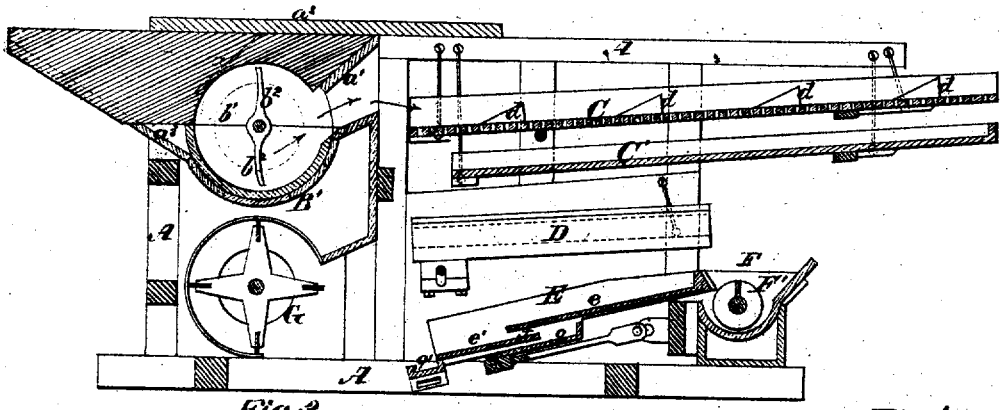
Figure 3:
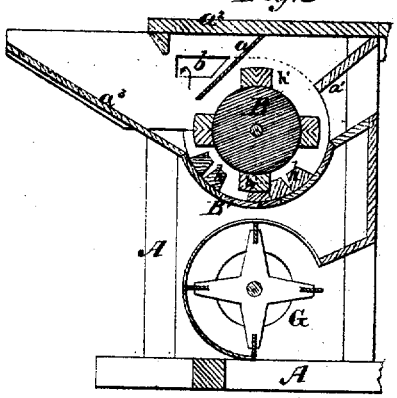
Figure 5:
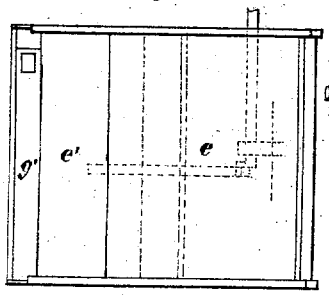
Figure 4:
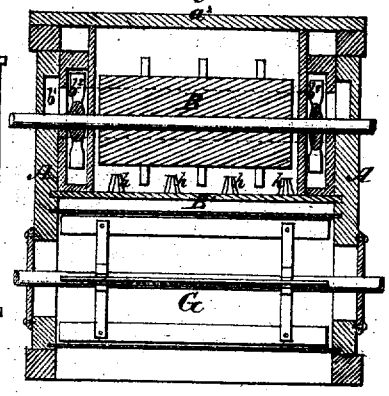
Figure 6:
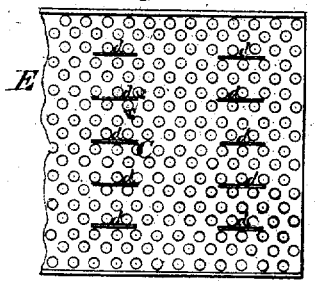

Figure 1 is an elevation of one side of the improved machine. Fig. 2 is a section taken vertically and longitudinally through the machine in the plane indicated by dotted line *x x* on Fig. 4. Fig. 3 is a section taken longitudinally and vertically through the thrashing and hulling and fanning-portions of the machine. Fig. 4 is a section taken transversely and vertically through the thrashing, hulling, and fanning-chambers. Fig. 5 is a top view of a separating-shoe, which is arranged beneath the screens. Fig. 6 is a top view of a portion of the perforated table over which the straw passes after it leaves the thrashing-drum. Figs. 7 and 8 are perspective views of two teeth of the concave and one tooth of the cylinder.

Similar letters of reference indicate corresponding parts in the several figures.

My invention relates to certain novel improvements on machinery which is designed for thrashing, hulling, and cleaning clover-seed, as will be hereinafter explained.

The following description of my invention will enable others skilled in the art to understand it:

In the accompanying drawing, A represents the frame of the machine. B is the thrashing and hulling-cylinder, which is armed with teeth *h'*, having double convex serrated sides, and which is arranged transversely across one end of the frame A, over a concave, B'. This concave B' is also armed with teeth *h*, presenting two concave serrated sides and two inclined serrated sides, as shown in Fig. 7. The cylinder B is housed in above by means of guard-boards $a$ $a^1$ and a covering-board, $a^2$, an opening in front being left for the introduction of substances to be thrashed, and another opening in rear of it for the discharge of the thrashed substance upon the shaker C. The inclined board $a^3$ is for conducting the substance to be acted upon into the concave B', or between it and the cylinder B. On each side of the passage leading into the concave is an opening, *b*, shown in Fig. 3, which opening is the induction or exhaust to a circular chamber, $b^1$, in which fan-blades $b^2$ are arranged upon the shaft of the cylinder B, as shown in Figs. 2 and 4. The dust, chaff, &c., arising in the thrashing and hulling-chamber at the point where the substances enter said chamber, are drawn into the fan-chamber $b^1$ through the openings *b*, and forced out at the opposite side of the cylinder B upon the straw-carrier or shaker C, as indicated by the arrows in Fig. 2. By thus providing fan-chambers at the sides of the machine the fan-blades can be applied on and driven by the shaft of the thrashing and hulling-cylinder, and all dust which rises in front of said cylinder will be conducted off instead of escaping into the face of the operator. The teeth on the cylinder B and concave B' are so constructed and arranged that the substance in passing between said parts will be thrashed and hulled, and then delivered upon the straw-carrier or shaker, where the seeds are separated from the straw and the latter tossed off from the rear end of the machine. The straw-carrier or shaker is a finely-perforated board or plate, having metallic pickers *d* arranged upon its upper surface for raising the straw and facilitating the separation of the seeds therefrom. This straw-carrier or shaker is hung by means of four rods, which are pivoted to the frame A and operated with a longitudinal rocking-and-tossing movement. Beneath this carrier or shaker C is an imperforated board or table, C', which receives upon it all the seed, &c., that fall through the shaker, and which conducts the substances downward and forward upon a screen, D, which is hung by rods at one end and connected to a crank at the other end, so that it receives combined vertical and longitudinal movements. The screen or shoe D separates from most of the chaff all the seeds which have been freed from their pods and discharges the seeds upon the inclined surfaces *e e'* of a vibrating shoe E, shown in Figs. 2 and 5. The seeds in the pods, and other foreign substances which do not pass through the screen D, are discharged therefrom into a trough, F, from which they are discharged, by means of a screw-conveyer, F', into the lower end of an inclined trough. In this trough is an endless elevating-apron, *f'*, which conveys the seeds in the pods back and delivers them into the thrashing-chamber again, where they are rethrashed. The vibrating shoe E is arranged directly beneath the screen D, so as to catch all the seeds which fall therefrom, and this shoe E is also arranged under the influence of blasts of air from a fan-chamber in which a fan, G, is applied. The seeds fall upon the inclined surface *e* of shoe E, and as they fall from this surface *e* upon the surface *e'* they will pass through strong air-blasts and be deprived of dust, chaff, and other foreign substances which may have escaped through the shaker C and screen D. It will be seen that the shoe E is provided with two inclined planes *e e'*, which are arranged so as to leave a space, *f*, between them, through which space the dust, &c., is blown as the seeds fall from the lower edge of the board *e* upon the upper part of the board *e'*. By thus arranging the surfaces *e e'* in different planes, one below the other, I leave a space between them for a blast of air to pass through and cause the seed to fall from a higher to a lower plane. And as the opening *f* is brought very near the fan-chamber and under the influence of a very strong blast of air from said chamber, a trap, *g*, is arranged, as shown in Fig. 2, so as to catch any good seeds which may be forced with the dust and chaff through the passage *f*. The back board of this trap *g* allows the air, and dust, &c., to escape over it; but retains the seeds and allows them to be conducted beneath the inclined plane *e'* and discharged into a suitable receptacle. A trough, *g'*, is arranged along the lower edge of the inclined plane *e'* for receiving the seeds discharged from the latter and conducting them laterally outside of the machine. The teeth *h*, which are arranged in rows upon the concave B' are construsted of pyramidal form, with two of their sides serrated diagonally and concave, and the teeth *h'* on the cylinder have convex sides and serrations, which are diagonal, corresponding to the concave sides of teeth *h*, except that the teeth *h* are dressed with the diagonal serrations in reverse, as shown in Figs. 3 and 8. These teeth will operate to the best advantage upon the unhulled clover-seed by retaining the same a greater length of time than is the case where the common forms of teeth are used, and when worn in their cutting-edges on one side can be reversed. The arrangement of thin sheet-metal pickers *d*, which are applied upon the surface of the straw-shaker, are an improvement on the wooden pickers generally used. The advantage of these metal pickers over the wooden ones is that the board C can be more thickly perforated, as the metal pickers are so thin that they will not cover the holes. The wooden pickers usually cover up about one-sixth of the surface of a straw-shaker, while the metal pickers occupy a very small amount of the surface thereof.

I do not claim as my invention, broadly, the employment of a suction-fan for carrying dust and chaff away from the thrashing-chamber; nor do I claim arranging a fan on the shaft of the thrashing-cylinder, when such fan does not draw the dust, &c., away from the operator who feeds the machine; nor do I claim such arrangement of fan when it draws dust through a blast-spout away from the operator; nor the metallic strips.

What I claim as new, and desire to secure by Letters Patent, is—

1. In a thrashing or clover-hulling and thrashing-machine which employs a fan, G, for blowing away chaff, dust, and other foreign substances, the dust-chamber $b^1$, situated within the frame of the machine, aperture *b*, fan $b^2$, and a discharge-passage at $a^1$ leading into a space above the straw-carrier or shaker, substantially as described.

2. The shoe E, constructed with inclined planes *e e'*, and a trap, *g*, in rear of the passage *f*, substantially as described.

3. The vibrating shoe E, (irrespective of the trap *g*,) constructed with stepped inclined planes *e e'*, and arranged as shown, in combination with the vibrating intermediate screen D, straw-carrier C, and fan G, substantially as described.

4. The shoe E, irrespective of the trap *g*, having one or more stepped inclines, as specified, and the intermediate screen D, disconnected and receiving motions independent of each other, and arranged in relation to the fan G, substantially as described.

5. The tailing-box F, conveyer F', and endless elevating-apron *f'*, in combination with screen D, shoe E, fan G, a straw-carrier C, and a thrashing-cylinder B, arranged substantially as described.

6. The specified construction of the teeth *h h'*, and their combination with each other and the cylinder and concave, for the purpose set forth.

MARTIN H. MANSFIELD.

Witnesses:
M. S. CAMPBELL,
H. L. LEE.

(111.)